(12) United States Patent
Mehrabanzad et al.

(10) Patent No.: US 6,408,021 B1
(45) Date of Patent: Jun. 18, 2002

(54) PCM MODEM ADAPTATION SYSTEM UTILIZING A SILENCE PERIOD

(75) Inventors: Sepehr Mehrabanzad, Southborough; Dae-Young Kim, Lexington, both of MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/496,754

(22) Filed: Feb. 3, 2000

(51) Int. Cl.[7] ............................................. H04B 1/38
(52) U.S. Cl. .................... 375/222; 370/286; 370/287; 379/406; 379/407
(58) Field of Search ........................... 375/222, 217, 375/220, 231; 370/278, 282, 286, 287; 379/93.32, 406, 407, 410

(56) References Cited

U.S. PATENT DOCUMENTS

| | | | | |
|---|---|---|---|---|
| 3,906,172 A | * | 9/1975 | Hoeschele, Jr. et al. | 179/170.6 |
| 5,612,955 A | | 3/1997 | Fernandes et al. | 370/433 |
| 5,740,242 A | * | 4/1998 | Hayashi | 379/411 |
| 5,745,564 A | | 4/1998 | Meek | 379/410 |
| 5,751,796 A | | 5/1998 | Scott et al. | 379/93.31 |
| 5,812,537 A | * | 9/1998 | Betts et al. | 370/286 |

OTHER PUBLICATIONS

PCT Search Report, PCT/US01/03331, 3 pgs.

* cited by examiner

*Primary Examiner*—Mohammad H. Ghayour

(57) ABSTRACT

In a full duplex PCM modem system, a method and apparatus is provided for robust measuring of the communications channel in which the digital modem's transmitter is silenced during generation of training signals by the analog modem, with the silencing of the digital modem's transmitter eliminating problems associated with echo during channel measurement at the digital modem. The above method thus eliminates echo during channel estimation and removes any dependencies on the performance of the echo canceller normally used.

9 Claims, 1 Drawing Sheet

PCM MODEM ADAPTATION SYSTEM UTILIZING A SILENCE PERIOD

FIELD OF INVENTION

This invention relates to the field of telecommunications in more particularly to a full duplex PCM modem system in which upstream channel impairments or variations are measured during a period of silence within the regular rate renegotiation sequence.

BACKGROUND OF THE INVENTION

In a full duplex modem system having interconnected analog and digital modems, after the initial startup procedure and when both modems have commenced data transmission, there may come a time when the digital modem detects or senses the need to update the analog modem parameters. This is done by re-probing the upstream channel to ascertain if the error rate has increased. Since the initial startup has been completed, the analog modem transmission is locked to the network timing via a loopback timing scheme. This lock to network timing is important because loopback timing is an essential requirement to correctly estimate the channel.

In order to get the loopback timing the modems must be in the full duplex mode. It is however, at this point that echo becomes an issue. When in the full duplex mode, the modem transmitters are keyed on and there exists an echo path from the modem's transmitter, through digital-to-analog and analog-to-digital converters to the modem's receiver where the channel probing takes place. Although echo cancellation at digital modem can be quite effective, it is never 100% effective.

More specifically, it is important to be able to generate a series of parameters at the digital modem which are utilized by the analog modem to reconfigure itself to take into account channel variations. It is these channel variations or impairments which are to be measured at the digital modem. In some instances, pre-equalization parameters, transmit constellation, and transmit power at the analog modem may need to be changed to accommodate changes in the upstream communications channel. These changes are made at the analog side in order to be able to maximize the performance of the analog modem, given the channel variations sensed at the digital side.

In full duplex PCM modem systems, echo canceling is utilized both in the analog modem and the digital modem to prevent the echo generated by modem transmitters from interfering with channel measurements or the data transmission itself. Echo cancellation has been effective in the past to preclude many types of distortions. However, it is only with difficulty that echo cancellers can be of sufficient quality to cancel all of the transmitted energy which is usually reflected as an echo back into the modem's receiver. This is especially troublesome when measurements are to be taken to measure channel variation or impairments during full duplex modem operation.

In order that the digital modem be able to measure the upstream channel characteristics, a test or training protocol is transmitted from the analog modem to the digital modem. The test or training protocol has known characteristics which are altered by the channel and are detected at the digital modem so that the effect of the channel can be ascertained. Upon ascertaining channel variations or impairments, a set of parameters is transmitted back to the analog modem to reconfigure or reset the analog modem to optimize it for the particular channel characteristics sensed. Typical parameters are the mapping parameters, constellation sets, and pre-equalization parameters.

It is known that full duplex transmission results in an echo path from the transmitter through the digital-to-analog converter at the central office or CO, and back through the analog-to-digital converter to the receiver where the channel characteristics are measured. As will be appreciated, an inability to adequately cancel the effects of the echo on the received signal results in the missmeasurement of the channel and therefore a sub-optimal set of parameters being transmitted from the digital modem back to the analog modem.

SUMMARY OF THE INVENTION

Rather than operating the digital and analog modems in full duplex mode, in the subject invention in the rate renegotiation sequence the transmission from the digital modem is inhibited during a window in which the test or training protocol from the analog side is transmitted. The cessation of the transmission at the digital modem completely eliminates echo as a factor at the digital modem's receiver, such that the test or training protocol signals can be used to accurately measure the upstream channel. Note that the silence period is limited, because if prolonged, loopback timing will be lost. If loopback timing is lost, the channel cannot be correctly estimated.

With echo-free measurement of the channel characteristics, the parameters sent or transmitted back to the analog modem more accurately reflect the condition of the channel, thus resulting in a more accurate setting of the precompensation elements utilized in the analog modem. Precompensation in general includes the setting of pre-equalization constants, the mapping parameters to set the output power of the analog modem and the transmit constellation to optimize the constellation for the transmission of the data.

With an optimal set of parameters it will be appreciated that communication is made more robust and that the speed at which the system can operate is increased. Were this not the case, as is common with high error rates engendered by changing channel conditions, speed must be reduced or throttled back.

In summary, in a full duplex PCM modem system, a method and apparatus is provided for robust measuring of the communications channel in which the digital modem's transmitter is silenced during generation of training signals by the analog modem, with the silencing of the a, digital modem's transmitter eliminating problems associated with echo during channel measurement at the digital modem. The above method thus eliminates echo during channel estimation and removes any dependencies on the performance of the echo canceller normally used.

BRIEF DESCRIPTION OF THE DRAWINGS

These and other drawings will be better understood in connection with the Detailed Description in conjunction with the Drawings, of which.

DETAILED DESCRIPTION

Figure 1:
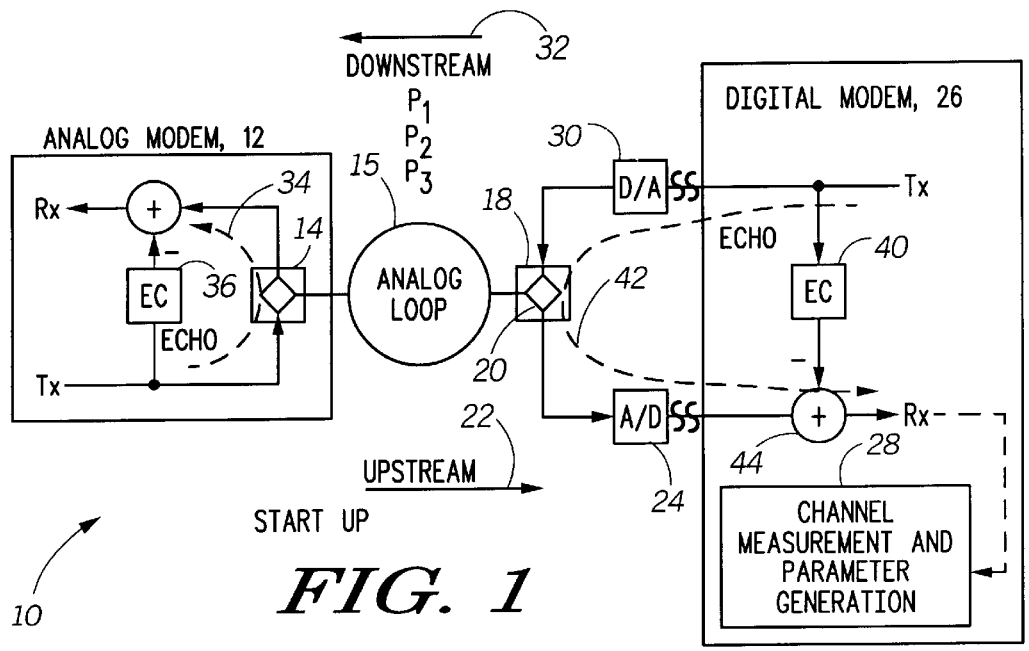
FIG. 1 is a block diagram of a full duplex PCM modem system involving the utilization of an analog modem and a digital modem, illustrating the echo path from the transmit section of the digital modem through the central office to the receive section of the digital modem; and, FIG. 2 is a block diagram of the full duplex PCM modem system of FIG. 1, illustrating the transmission of a training sequence from the analog modem to the digital modem during rate renegotiation, also illustrating the cessation of the transmission from the transmitter section of the digital modem during the time window established for the receipt of the test or training sequence, thus eliminating echo completely for more accurate channel estimation.

Referring now to FIG. 1 a PCM modem system 10 includes an analog modem 12 coupled by a hybrid circuit 14 through a local analog loop 16 to a central office 18. Note in an analogy modem that an analog-to-digital converter usually exists in the receive path and a digital-to-analog converter usually exists in the transmit path. In the central office is a hybrid circuit 20 which, in the upstream direction as illustrated by arrow 22, converts analog data to a digital stream through the utilization of an analog-to-digital converter 24. It is this information which is applied to the receive section of a digital modem 26 to, inter alia, permit channel measurement and parameter generation as illustrated at 28.

In general, the transmit section of digital modem 26 transmits continuously, with the output signal being coupled through a digital-to-analog converter 30 and thence to circuit 20 in central office 18. The signal from the central office is applied in a downstream direction as illustrated by arrow 32 through local analog loop 16 and circuit 14 to the receive section of analog modem 12. It is the purpose of the transmission to transmit parameters P1, P2 and P3 to configure or set pre-compensation circuits within the analog modem which are used to optimize the output of the analog modem for the channel. Parameters P1, P2 and P3 refer to setting of pre-equalizer, transmit constellations, and mapping parameters that among other things are utilized to control the output transmit power of the analog modem.

As can be seen, an echo path 34 illustrated in dotted outline exists from the analog modem's transmitter to its receiver through the hybrid, such that transmitted energy bleeds back to the receiver. An echo canceller such as illustrated at 36 has been utilized to cancel the effect of the echoes at the analog side.

A similar type of echo cancellation has been used in digital modems such as illustrated at 40. Some digital modem echo cancellers take the effect of the digital impairments, downstream and upstream, into account in order to improve the performance of the echo cancellation. An echo canceller is coupled between the transmitter and the receiver to cancel the effects of the echo, with the echo path illustrated by dotted line 42. This echo path goes from the transmit side through the digital-to-analog converter through hybrid 20 and through the analog-to-digital converter to a receiver node 44. As is common, the echo canceller taps off signals from the transmit side and provides an out-of-phase signal to node 44 to cancel the effects of the echo.

The problem with such a scheme is that there remains some residual echo. Invariably unwanted components creep back into the digital modem's receiver such that the channel measurements made at unit 28 are often corrupted with residual echo signal. The result, as mentioned before, is the generation of parameters, P1, P2 and P3, which are not fully accurate due to non-optimal channel estimations. When these parameters are error-prone, the analog modem is not properly set up. As a result, there may be throttling back of the data transmission rate and lower throughput.

It will be appreciated that provision of parameters P1, P2 and P3 occur in a so-called rate renegotiation sequence in which the parameters are set for the various pre-compensation components of the analog modem. Usually, P1, P2 and P3 are set during a procedure in which a test or training sequence is transmitted from the analog modem to the digital modem and in which channel measurements are made based on this a priori signal stream. In this renegotiation sequence, it is mis-measurement of the channel which causes mistakes to be made in the setting of parameters P1, P2 and P3.

Figure 2:
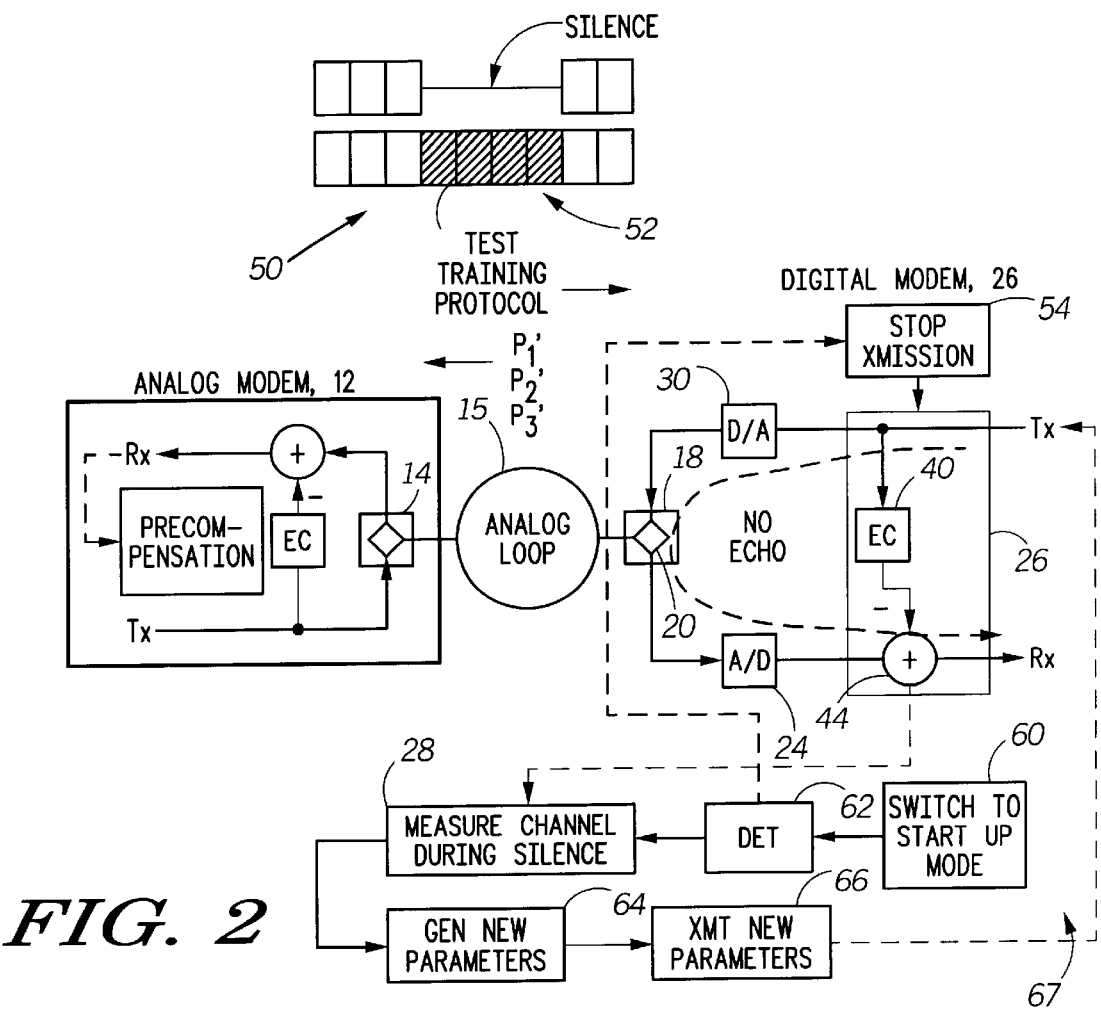

Referring now to FIG. 2, the aforementioned test or training sequence is illustrated at 50 and is set to occur in the window indicated by shading 52 to be within a predetermined portion of the data stream from the analog modem to the digital modem. The location of this window is known at the digital modem and a unit 54 is utilized to key off the transmitter of the digital modem during this window. The result is that echo path 42 ceases to exist during the test or training sequence window. Thus, the measurements made of the channel at node 44 can be made free of echo considerations.

Thus while an echo canceller may be used between the transmit side and the receive side as indicated by echo canceller 40, the quality of this echo canceller can never be such that the echo is completely removed during the training sequence.

In operation, the system is switched to the startup mode as illustrated at 60. This fact is detected by unit 62, which is utilized to activate unit 64 to key off the digital modem's transmitter at the appropriate time, thus to provide a silence period.

Software within the digital modem causes the modem to measure the receive channel as illustrated at 28 during this silence period and generate new parameter sets P1, P2, and P3 at 64, and to transmit the new parameters 66 to the analog modem after having keyed on the transmit section of the digital modem as shown by arrow 67.

The test and training protocol as well as the method by which the analog modem sends these signals to the digital modem is described in U.S. patent application Ser. No. 09/390,106, entitled Method and Apparatus for a Startup Procedure for Digital and Analog Modems Utilizing Pulse Code Modulation for Data Transmission, filed Sep. 3, 1999, assigned to the assignee hereof and incorporated herein by reference.

While the subject invention has been described in connection with the silencing of the digital modem's transmitter to permit channel measurements to be made when in full duplex mode, the subject silencing system can be used to advantage in the analog modem as well. This enables, the analog modem to detect the down stream channel unencumbered by echo.

One difference however, is that if the analog modem transmitter is keyed off, the loop backed timing is not lost. This is because the analog modem can tract the network timing via the received signal from the digital modem. Once keyed on, the analog modem can continue transmission locked to network timing.

Thus, the echo elimination discussed in conjunction with the digital modem can be mirrored in the analog modem, if required.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In a full duplex pulse code modulation PCM modem system, wherein the modems within the PCM modem system are locked to a network timing, a method for eliminating the effects of echo on channel estimation at a modem within the PCM modem system due to an echo path between the transmitter and receiver thereof, comprising keying off the transmitter during the period at which channel estimation measurements are to be made, therefore, causing the transmission from said transmitter to cease during said channel estimation, thus eliminating the effects of echo on said channel estimation, and wherein the transmitter is keyed back on before the network timing is lost.

2. In a full duplex pulse code modulation PCM modem system having an analog and digital modem interconnected over a network channel, wherein the modems within the PCM modem system are locked to a network timing a method for reducing errors in channel estimation at the digital modem, comprising the steps of:

generating a sequence of training signals at the analog modem;

transmitting the training signals to the digital modem over a network channel; and, keying off the transmitter of the digital modem during the time period that the training signals are received at the digital modem, whereby echo normally associated with signals from the transmitter of the digital modem to the receiver thereof is eliminated, thus permitting channel estimation at the receiver of the digital modem to be free of error components due to echo wherein the transmitter is keyed back on before the network timing is lost.

3. The method of claim 2, wherein the digital modem is switched to a startup mode and further including the step of detecting when the digital modem is switched to the startup mode, the keying off of the transmitter occurring upon detection of the switch to the startup mode at the digital modem.

4. The method of claim 2, and further including measuring the channel during the period that the transmitter is keyed off, thus to permit echo-free channel estimation.

5. The method of claim 4, and further including the step of determining new parameters responsive to the channel estimation.

6. The method of claim 5 and further including the steps of keying the transmitter back on and transmitting the new parameters to the analog modem when the transmitter is keyed back on.

7. In a full duplex pulse code modulation PCM modem system having an analog and digital modem connected over a network channel, wherein the modems within the PCM modem system are locked to a network timing, apparatus for reducing errors in channel estimation at the digital modem comprising:

a transmitter at the digital modem; and a unit for causing the transmission from said transmitter to cease during said channel estimation, thus to eliminate the effects of echo on said channel estimation wherein the transmitter is keyed back on before the network timing is lost.

8. The apparatus of claim 7, wherein said unit includes a keying circuit for turning said transmitter on and off.

9. The apparatus of claim 8, and further including a circuit for placing said digital modem in a startup mode, and a detector having a predetermined output when said digital modem is placed in said startup mode and when said channel estimation is to begin, and wherein said unit is keyed off responsive to the output of said detector.

* * * * *